United States Patent [19]

Ducate, Jr.

[11] Patent Number: 4,697,506
[45] Date of Patent: Oct. 6, 1987

[54] TRAY FOR GENERATING FOOD FLAVORING SMOKE

[75] Inventor: John S. Ducate, Jr., Columbia, S.C.

[73] Assignee: The Ducane Company, Columbia, S.C.

[21] Appl. No.: 896,158

[22] Filed: Aug. 13, 1986

[51] Int. Cl.⁴ ............................................... A23B 4/04
[52] U.S. Cl. .................................... 99/482; 126/41 R
[58] Field of Search ................ 99/467, 482, 481, 480, 99/468, 469, 470, 485, 483; 126/41 R, 26, 9 R

[56] References Cited

U.S. PATENT DOCUMENTS

| | | |
|---|---|---|
| 2,262,910 | 11/1941 | Aller . |
| 2,984,171 | 5/1961 | Lee . |
| 3,019,720 | 2/1962 | Topper . |
| 3,340,864 | 9/1967 | Torian . |
| 3,776,127 | 12/1973 | Muse ...................................... 99/482 |
| 4,190,677 | 2/1980 | Robins . |
| 4,374,489 | 2/1983 | Robbins ............................ 126/41 R |
| 4,462,307 | 7/1984 | Wells ...................................... 99/482 |
| 4,471,748 | 9/1984 | Venable . |

OTHER PUBLICATIONS

Drawings Nos. 10170; 10171; and 10172 of Ducane Heating Corporation.
Ducane Retail Price List bearing the date Sep. 1, 1985.

Primary Examiner—Robert W. Jenkins
Attorney, Agent, or Firm—Pollock, Vande Sande & Priddy

[57] ABSTRACT

A substantially U-shaped or V-shaped tray for flavoring food by burning woodchips. The tray includes an elongated base and opposing sidewalls which may diverge outwardly from the base. Each of the sidewalls contain a plurality of apertures at spaced intervals along the length of the sidewall. The number, size and location of the apertures and the angle of any sidewall divergence are such that when the tray is positioned above and in close proximity to a heat source, the apertures permit sufficient direct heating of the woodchips to cause burning thereof by smoldering and the solid portions of the base and sidewalls shield the woodchips sufficiently to prevent flaming thereof.

20 Claims, 7 Drawing Figures

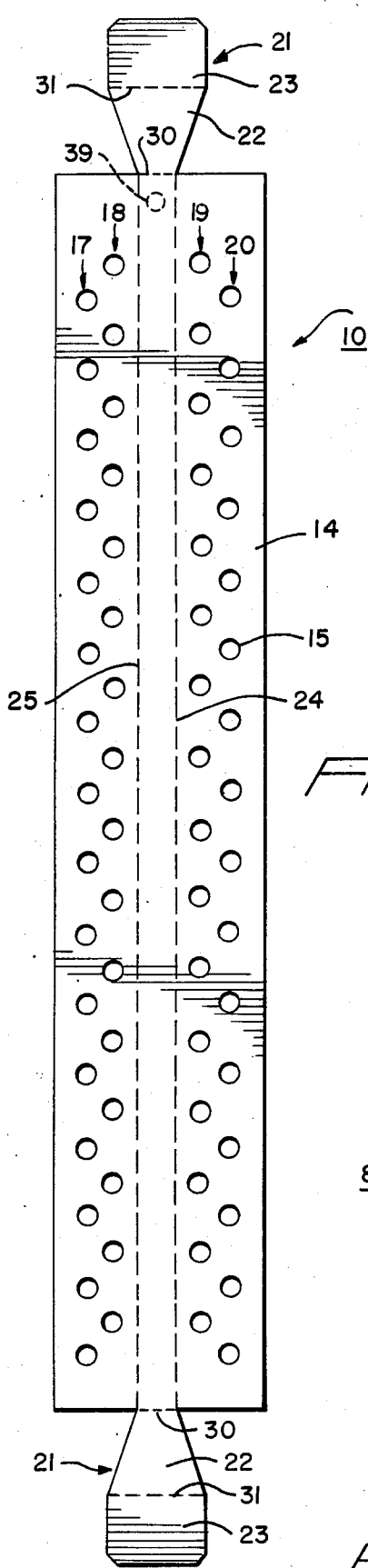
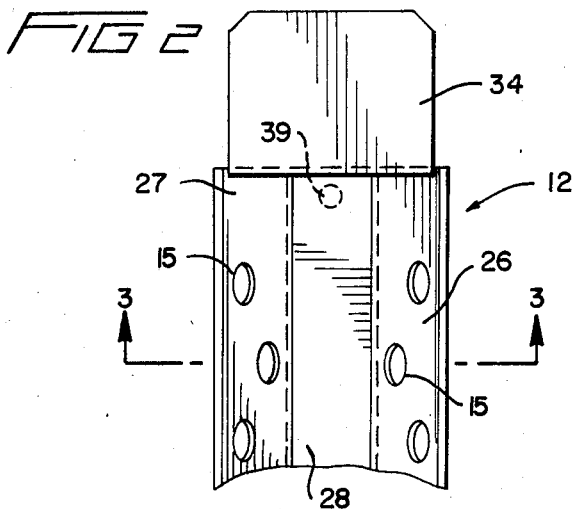
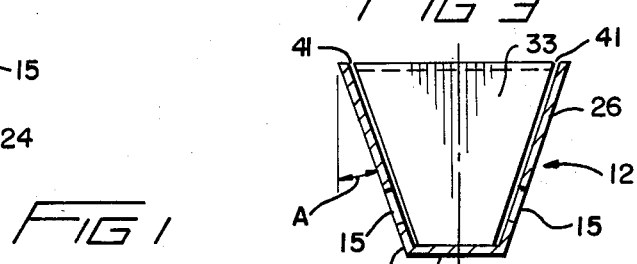
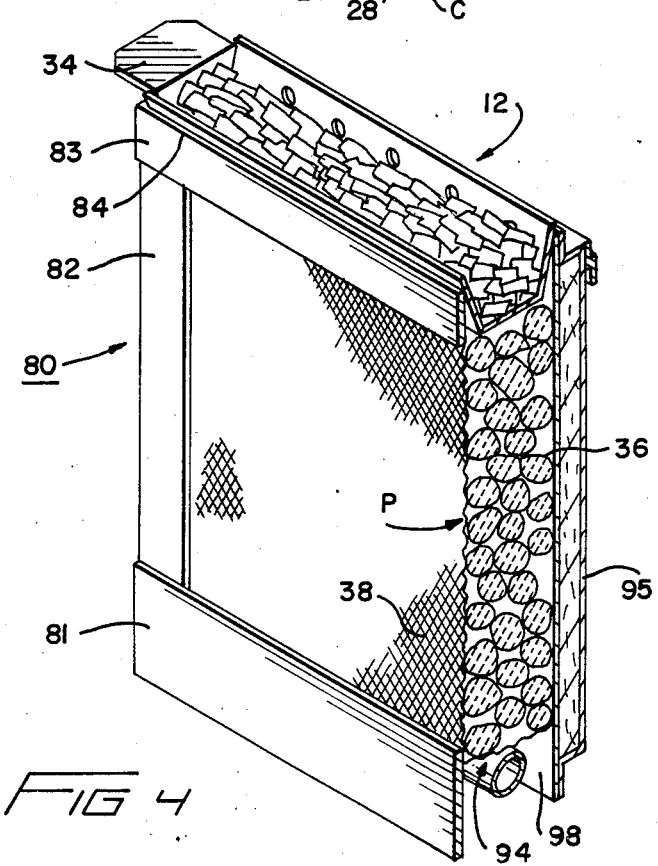

TRAY FOR GENERATING FOOD FLAVORING SMOKE

TECHNICAL FIELD

The present invention relates to an apparatus for imparting flavor to food while it is being cooked. More particularly, the apparatus of the present invention relates to a tray for producing a flavoring smoke and vapor from the burning of woodchips and the like.

BACKGROUND OF THE INVENTION

In the art of cooking, means may be provided for surrounding the food being cooked with a flavoring smoke which imparts to the food what is often referred to as a "barbecue" flavor. The barbecue flavor sought to be achieved in modern cooking appliances originated in open-pit cooking of a whole domestic animal such as a steer or pig. This cooking technique involved building a fire of hardwood logs, such as hickory, in a pit dug in the ground and mounting the carcass of the steer or pig over the pit by means of a spit which was rotated from time to time to achieve relatively even cooking of the meat. Many hours of cooking time were required and during this time the smoke generated by the burning logs would impart a particular "barbecue" flavor to the meat.

Efforts have been made in the past to achieve the same type of barbecue flavor with modern cooking appliances, especially outdoor grills burning either charcoal or gas. However, it is difficult to achieve the same barbecue flavor with such modern appliances because the fuel is different and much shorter cooking times are involved. Some of the past efforts in this field are described in the following paragraphs.

U.S. Pat. No. 4,190,677 issued to Robins suggests that barbecue flavoring may be achieved by placing a bed of wood flour upon a tray suspended over a bed of burning charcoal. However, the tray shields the wood flour and it is slow to ignite because the bottom of the tray must be heated to its ignition temperature. Woodchips would be even more difficult to ignite. On the other hand, the use of woodchips would be desirable in order to generate smoke for substantially longer periods of time.

U.S. Pat. No. 4,471,748 issued to Venable suggests suspending a tray of woodchips directly beneath a burning bed of charcoal fuel. In the arrangement disclosed here, there is no shielding of the woodchips and their direct exposure to the hot coals causes rapid incineration of the woodchips to ash. Such rapid burning allows very little time for smoke generation and requires frequent replacement of the woodchips.

DISCLOSURE OF THE INVENTION

The present invention overcomes the foregoing disadvantages of the prior art by providing a dense concentration of flavoring smoke from quickly ignited but slow burning woodchips. The invention comprises a smoker tray for igniting and slowly burning woodchips. The tray has a plurality of apertures at spaced intervals along opposing sidewalls. These apertures expose woodchips held in the tray to both radiant and convection heat from an underlying heat source, which may be burning charcoal or burning gas in combination with ceramic briquettes.

Although they may be substantially parallel, the apertured sidewalls of the tray preferably diverge upwardly from an elongated base in opposed relation so as to form a chamber for holding the woodchips. The sidewalls extend longitudinally along the base with one edge of each sidewall integrally connected to a corresponding edge of the base. Each end of the tray is preferably closed by an integral end wall extending transversely to both the base and the sidewalls. Each end wall includes a projecting tab for mounting the tray over the heat source. The closing function of the integral end walls may be provided instead by entirely separate transverse walls, one in abutment with each end of the tray, such as opposing walls of a cooking unit from which the tray may be suspended. If integral end walls are omitted, tabs for mounting the tray may be connected to the tray at each end of its sidewalls.

An important feature of the invention is that the number, size and location of the apertures are such that when the tray is positioned with its base above and in close proximity to the heat source and with its sidewalls extending away from the heat source, the apertures permit sufficient direct heating of the woodchips to cause burning thereof by smoldering, and the solid portions of the base and sidewalls provide sufficient shielding of the woodchips from the heat source to prevent flaming thereof. As used in this specification, "close proximity" means preferably within about 0 to about 4 inches, more preferably within about $\frac{1}{4}$ inch to about 3 inches, and most preferably within about $\frac{1}{2}$ inch to about 2 inches, of a heat source comprising burning coals, heated refractory material such as ceramic briquettes, electrical resistance wires, or equivalent sources of radiant heat.

Preferably, the sidewalls are substantially symmetrical relative to an imaginary plane normal to the base and pass through the central longitudinal axis of the base. The sidewalls of the tray preferably diverge at a slope relative to the base and this slope is selected along with the number, size and location of the sidewall apertures so that only a predetermined proportion of the heat reaching the tray from the heat source will pass through the apertures and cause ignition and burning of the woodchips. Preferably no apertures are provided in the base, although there may be at least one small hole in the base for drainage if there otherwise is sufficient shielding of the woodchips as discussed below.

It is preferred that the base be substantially flat and have a substantial width in transverse cross-section. However, the base instead may be so narrow as to provide a V-shaped base at the bottom of a V-shaped tray. For purposes of this specification, a base of substantial width defines a tray having a substantially U-shaped transverse cross-section, irrespective of whether the tray sidewalls are substantially parallel or diverge outwardly.

The number, size and location of the apertures in the sidewalls and the opposing relation of the sidewalls are such that when the tray is positioned above and adjacent to a source of heat, the apertures permit sufficient direct heating of the woodchips to cause them to ignite and smolder, while the solid portions of the base and sidewalls shield the woodchips from the heat sufficiently to prevent substantial flaming of the woodchips. Although some radiant heat preferably reaches the woodchips directly to aid in their ignition, they burn mostly in response to convection heat passing through the apertures and conduction heat from the heated metal of the tray. Radiant and convection heating of the tray itself is enhanced by hot combustion and/or convection gases flowing through the apertures. This hot gas flow also provides a dense flavoring smoke from the smoldering woodchips and causes this smoke to be substantially evenly distributed throughout the cooking volume of the grill unit. The "cooking volume" is defined by the volume of those spaces in which food may be cooked. The solid portions of the tray preferably shield the woodchips so that they burn substantially entirely in response to convection and conduction heat generated by the heat source.

The angle between each sidewall and the central plane, which corresponds to a vertical plane when the tray is in its smoke generating position, is preferably in the range of about 10° to about 50°, more preferably about 15° to about 45°, and most preferably substantially about 20°. The apertures preferably are of uniform size and a plurality thereof preferably are arranged in each sidewall at spaced intervals to provide a series extending along the entire length of the sidewall. The apertures preferably are spaced at substantially uniform intervals along the length of the sidewall and are arranged preferably in at least one row, more preferably in two rows with one staggered relative to the other. An important consideration also is the apertured are relative to the solid area of the body of the tray, which includes a preferably solid base but excludes end walls and related mounting structure. The ratio between the solid area and the apertured area is in the range of preferably about 10:1 to about 20:1, more preferably about 15:1 to about 18:1, and most preferably about 16:1 to about 17:1. The most preferred ratio is substantially 16.5:1.

The smoker tray of the invention preferably is filled with wet woodchips and then placed within an outdoor type barbecue grill having an enclosing hood so that smoke generated by the smoldering woodchips will be retained within the cooking volume of the grill. Thus, when the hood of the grill is in its closed position, the interior cooking volume of the grill will be filled with smoke generated by smoldering woodchips in the smoker tray and this smoke will impart a highly pleasing barbecue flavor to meat or other food being cooked within the cooking volume. The food being cooked may be supported either on a rotisserie apparatus mounted in the interior of the grill or on the upper surface of a horizontal cooking grill or other cooking surface. In this specification, the term "barbecue grill" refers to the entire cooking unit while the term "cooking grill" refers to the component having an actual cooking surface for supporting food over a heat source. One such cooking grill comprises a horizontal member with parallel bars on which food is exposed to the heat source. When used with a cooking grill, the smoker tray may be supported adjacent to one side of the cooking grill by having the ends of the tray engage the same support structure as engaged by the cooking grill. As an alternative arrangement, the smoker tray may be placed directly on the cooking grill so that its base is supported by the parallel bars or other open lattice work of the cooking surface, provided that the portion of the cooling surface supporting the base is in close proximity to the heat source.

The barbecue grill assembly described in U.S. Pat. No. 4,089,258 to Berger has both a vertical firebox and a horizontal firebox. The smoker tray of the present invention may be used with either or both of these fireboxes. Accordingly, the entire contents of this Berger patent is incorporated herein by reference.

Both fireboxes of Berger are gas fired and employ intervening refractory material for radiant or infrared cooking of the food in a highly efficient and tasty manner. This barbecue grill includes an upright housing in which a rotisserie is mounted for holding and turning food at a position in opposing relation to the vertical firebox. The vertical firebox includes an upstanding panel of refractory briquettes or other ceramic material for providing radiant heat laterally toward the axis of the rotisserie spit so as to cook food mounted and rotated thereon. The horizontal firebox includes a horizontally extending bed of charcoal or ceramic briquettes supported by a horizontal coal grate. The barbecue grill may include two different gas burners, one beneath the vertical firebox assembly and the other beneath the coal grate of the horizontal firebox. Beneath the horizontal firebox and the spit may be placed a horizontally extending cooking grill for supporting foodstuffs in the usual manner of outdoor barbecue grills.

The smoker tray of the invention may be mounted either over the horizontal firebox or in the top of the vertical firebox of the Berger barbecue grill. The smoker tray of the invention is particularly effective in combination with the vertical firebox of Berger because the vertical frame of this firebox serves as a flue for directing a substantial proportion of the combustion gases from the underlying burner through the apertures of the smoker tray when it is suspended across the upper end of the vertical firebox frame. Smoke gerenated by this smoker tray may be used to flavor food while it is being cooked either on the rotisserie element opposite the vertical firebox or on the horizontal cooking grill extending over the horizontal firebox.

When food is cooked on the rotisseries spit, a drip pan may be positioned beneath the spit to collect food drippings and these drippings may be used as a source of basting fluid for the cooking foodstuff. The drip pan may rest either on the horizontal cooking grill or may be mounted in place of or below this grill. Some of the drippings also may be evaporated by the heat intercepted by the drip pan and this will create a moistening vapor which may help flavor the foodstuff and will tend to keep it juicy and tender. When the drip pan is in place, the food may be cooked by radiant heat from the vertical firebox and convection heat from the horizontal firebox. Alternately, the drip pan may be removed so that the drippings from the foodstuff will fall direclty onto hot ceramic briquettes resting on the coal grate, thereby providing another source of flavoring smoke. When the drip pan is removed, the food also may be cooked by radiant heat from the horizontal firebox.

In addition to the numerous advantages apparent from the foregoing discussion, the smoker tray of the invention has the further advantage that it can be made rapidly and economically by stamping it from a sheet of metal material, such as carbon or stainless steel. The tray also has the advantages of simplicity, ruggedness, and ease of use. The invention therefore provides a practical, efficient and reliable smoking unit that can be made from standard materials and assembled in economical fashion with relatively few machine tools and assembly steps. Other objects and advantages of the invention will be readily apparent from the annexed drawings and the specific description of the preferred embodiments of the invention as given below.

BRIEF DESCRIPTION OF THE DRAWINGS

The invention may be further understood and appreciated from the specific description below and the accompanying drawings in which:

FIG. 1 is a plan view of an unbent blank of sheet metal from which the smoker tray may be formed;

FIG. 2 is a fragmentary plan view of an assembled smoker tray;

FIG. 3 is a sectional view of the smoker tray taken along line 3—3 of FIG. 2;

FIG. 4 is a fragmentary perspective view showing structural details of a vertical firebox in which the smoker tray is mounted;

DESCRIPTION OF THE BEST MODE AND OTHER EMBODIMENTS

Figure 5:
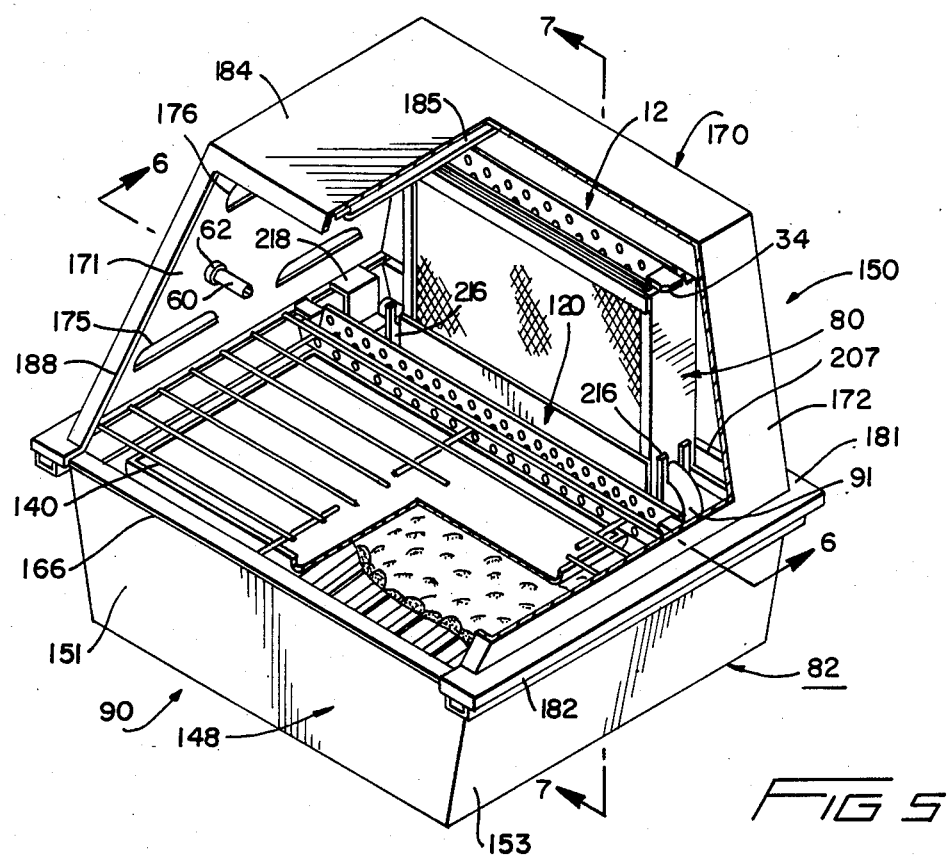
FIG. 5 is a perspective view of a barbecue grill illustrating use of the invention with both vertical and horizontal firebox assemblies.

Referring now to the drawings and particularly to FIGS. 1-4 thereof, there is illustrated one form of tray made according to the present invention for burning woodchips and the like to generate a food flavoring smoke. This tray, which is generally designated 12, is referred to as the "smoker tray" in this specification.

In FIG. 1, there is shown an unbent blank 10 of sheet metal, preferably carbon steel or stainless steel, which is first formed by an initial stamping operation and then is bent by further stamping operations to provide the final structure of the smoker tray 12 as shown best in FIGS. 2-4. The body 14 of blank 10 contains a plurality of apertures 15 arranged in four longitudinally extending rows 17, 18, 19 and 20. The apertures in rows 17 and 20 preferably are staggered relative to the apertures in rows 18 and 19, and the apertures in row 17 are preferably laterally opposite to the apertures in row 20 and the apertures in row 18 are preferably laterally opposite the apertures in row 19 as shown in FIGS. 1 and 2. Blank 10 includes a pair of tabs 21-21 one at each longitudinal end. Each tab 21 preferably has a trapezoidal inner section 22 and an outer section 23 which may be substantially rectangular or have some other shape.

In forming the smoker tray 12 from the blank 10, the blank is bent transversely along a pair of longitudinal bend lines 24 and 25 to provide sidewalls 26 and 27 of tray 12. The area of the tray blank 10 between bend lines 24 and 25 provides a tray bottom 28. The tabs 21-21 at opposite ends of the blank 10 are also bent twice relative to the body 14 along transverse bend lines 30-30 and 31-31 so as to provide an end wall 33 and a mounting lip 34 at each end of the tray 12 as shown best in FIGS. 2 and 3. The lips 34-34 provide a means for mounting the tray 12 so that it may be suspended above a horizontal bed or a vertical panel of refractory briquettes or lumps of solid fuel, such as charcoals.

Figure 7:
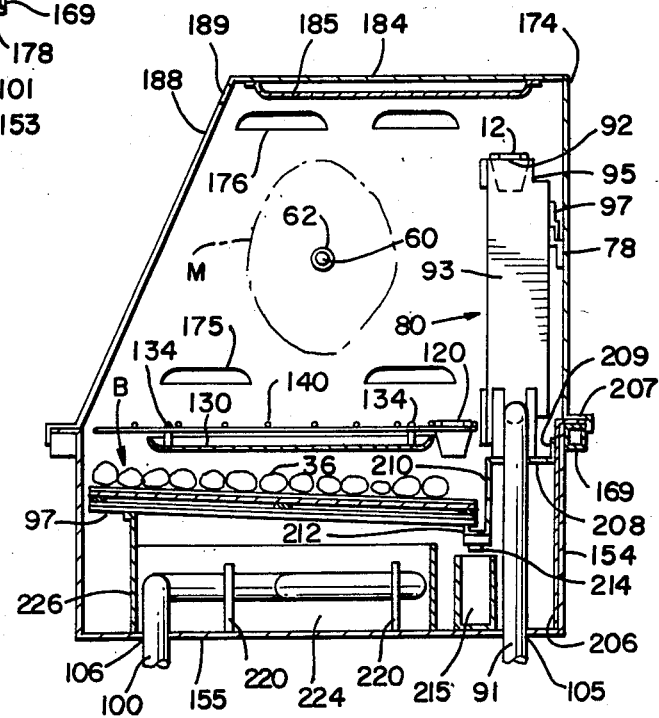

A vertical panel P or briquettes may be defined by a vertical firebox, generally designated 80, as shown in FIG. 4. The panel P is defined by a front screen member 38, a rear wall 98, a pair of screen supporting side frame members 82-82, a bottom frame member 81, a top frame member 83, and a pair of opposing sidewalls 93 (FIG. 7). The vertical firebox 80 has an open top 84 for receiving the tray 12.

Referring to FIG. 3, the smoker tray is preferably symmetrical about a central axis C which is perpendicular to base 28. Each sidewall 26 and 27 is sloped relative to base 28 so as to be at an angle A with respect to the central plane C, which corresponds to a vertical plane when the tray is in its smoke generating position. The angle A is preferably in the range of about 10° to about 50°, more preferably about 15° to about 45°, and most preferably substantially about 20°.

Referring again to FIG. 1, there is a preferred ratio between the solid area of the body of the tray (which does not include the end walls and lips provided by tab portions 21) and the apertured area represented by the combined total of the open areas of all of the apertures 15 in rows 17, 18, 19 and 20. The ratio between the solid area of the tray body and this total apertured area preferably is in the range of about 10:1 to about 20:1, more preferably in the range of about 15:1 to about 18:1 and most preferably substantially about 16.5:1. This ratio between the solid area and the apertured area of the tray body and the angle between the sidewalls and central plane of the tray are such that when the tray is positioned above and adjacent to a source of heat, the openings of the apertures permit sufficient direct heating of woodchips held in the tray to cause the woodchips to ignite and burn by smoldering, while the solid are shields the woodchips sufficiently from direct heat to prevent substantial flaming of the burning woodchips.

The invention contemplates a tray base which may contain one or more small additional apertures such as at 39 which may serve as drain holes to prevent an accumulation of liquid in the bottom of the tray. However, it is preferred that the area of such auxiliary apertures be sufficiently small so as not to interfere with the shielding function of the solid area of the tray. In other words, the total apertured area of auxiliary holes in the base should not be sufficient to significantly affect the ratio of the solid area to the apertured area of the tray. The need for auxiliary drain holes may be eliminated by leaving the ends 33 of the tray unsecured to its sidewalls so that there are a pair of gaps 41-41 along the edges of each tray end wall. These edges will allow drainage of any fluid tending to collect in the bottom of the tray. However, the invention contemplates that the end walls 33 of the tray may be sealingly attached to the sidewalls 26 and 27, such as by welding. In the event of such a sealing attachment, the provision of at least one auxiliary drainage hole 39 is preferred.

Figure 6:
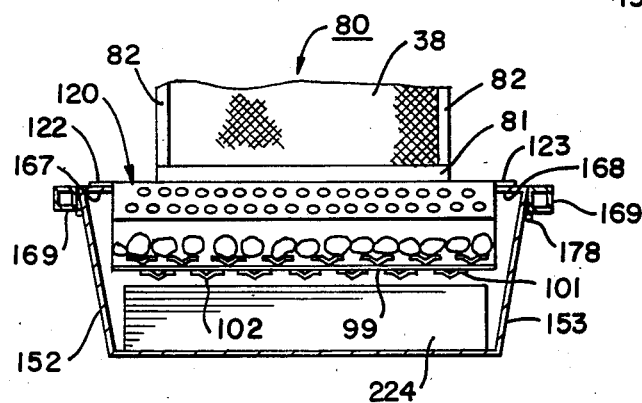
FIG. 6 is a fragmentary sectional view of the barbecue grill taken along line 6—6 of FIG. 5 and showing structural details of one side of the smoker tray; and, FIG. 7 is a side elevational view of the barbecue grill in section taken along line 7—7 of FIG. 5 and illustrating mounting of the smoker tray either within the vertical firebox assembly or within the horizontal firebox assembly.

Referring now to FIGS. 5-7 of the drawings, there is illustrated one form of gas fired barbecue grill, generally designated 90, employing a smoker tray made according to the present invention. Similar gas fired barbecue units are described in the above referenced U.S. Pat. No. 4,089,258 to Berger.

The vertical firebox assembly 80 previously described is combined with a horizontal firebox assembly, generally designated 82, which includes a lower pan 148 of a housing, generally designated 150. Housing 150 includes a separate hood component, generally designated 170, which includes inwardly sloped sidewalls 171 and 172, a vertical rear wall 174 and a top wall 184. Each sidewall is provided near its base with inlet air louvers 175 and near its top with outlet or exhaust gas louvers 176. Hood 170 has an opening 188 at its front for supporting a glass panel (not shown) for observing the cooking food. The front opening 188 is defined on three sides by a front wall portion 189 which slopes rearwardly from bottom to top in conformity with a corresponding rearward slope of the adjacent sidewall edges. Top wall 184 is protected from hot combustion gases generated in vertical firebox 80 by an underlying heat baffle 185.

An outwardly projecting flange 181 with a depending outer ridge 182 extends around the lower edge of the hood walls. Flange 181 is thus positioned around the base of the hood so as to rest upon supporting surfaces around the upper edges of the four walls of pan 148. Ledge 166 along the upper edge of front wall 151 supports the front of the hood. Supporting ledges for the hood also are provided by a rectangular channel member 169 which extends along the outside upper edge portion of opposing sidewalls 152 and 153 and rear wall 154. To further strengthen the forward runs of channel 169 and provide lateral support thereto, a spacer rod 178 is welded between the outer surface of the sloping sidewalls of pan 148 and the lower inside corner of channel 169 as illustrated in FIG. 6.

Referring now to FIG. 7, a reinforcing rear wall member 206 abuts, but is not secured to, rear wall 154. The upper portion of an auxiliary wall 206 is bent outwardly to form a projecting rear ledge 207. Channel 169 is not attached in any way to the underside of projecting ledge 207 so that auxiliary wall 206 and related structure are removable from the horizontal firebox as discussed further below.

Outwardly projecting hood supporting ledges are thus provided around the upper periphery of horizontal pan 148 by front ledge 166 and the side and rear runs of channel 169. The width of flange 181 is such that depending ridge 182 slips snugly over the outer periphery of the supporting ledges so as to center and hold the hood upon the lower firebox unit. The weight of hood 170 firmly seats the hood against horizontal displacement once it is in place over the horizontal pan. However, the hood can be readily detached by raising it a sufficient distance to bring ridge 182 clear of abutting surfaces.

Rear ledge 207, which is supported by both rear wall 154 and auxiliary wall 206 and is further reinforced by channel 169, may carry a significant portion of the weight of the vertical firebox 80. This is because the vertical firebox 80 can be mounted on the rear wall 174 of the hood by means of a bracket 78 which receives the lower end of dog leg hanger 97 secured to a rear insulating panel 95 of the firebox 80. Hanger 97 is detachable from bracket 78 so that vertical firebox 80 also is removable from the grill assembly.

Welded to auxiliary wall 206 is a horizontal platform 208 for supporting from below both the lower end of firebox 80 and the rear end of a horizontal grate 97 which is a component part of horizontal firebox 82. Horizontal platform 208 has an upstanding rear flange 209 rigidly secured to auxiliary rear wall 206 and a dog leg hanger 218 on the end adjacent to pan sidewall 152 and a dog leg hanger (not shown) on the opposite end adjacent to pan sidewall 153. A pair of burner brackets 216-216 are secured to the central portion of platform 208 and cradle a horizontal run of a rear burner 91 as illustrated in FIG. 5. Vertical firebox 80 in turn is supported by the horizontal run of burner 91 which passes through and engages the tops of corresponding slots in sidewalls 93 of the vertical firebox.

Depending from platform 208 is a forward panel 210 upon which is mounted a U-shaped channel member 212 arranged to support the rear end of grate 97 which may carry a bed B of consumable coal lumps or of non-consumable ceramic or refractory briquettes 36. The forward end of coal grate 97 is supported by the upstanding front panel 226 of a rectangular heat baffle 224 resting upon the bottom 155 of pan 148 as illustrated in FIG. 7. Channel 212 slopes toward the center of the grill and is provided there with a drain tube 214 below which a container 215 may be positioned for collecting any grease or drippings caused by or conveyed to the channel member 212 by grease collecting stringers 101 of grate 97. Stringers 101 have a V-shaped channel 102 for this purpose as seen best in FIG. 6. The stringers of grate 97 are secured together by transverse channel members 99. Stringers 101 are sloped toward the rear so as to convey to channel member 212 any grease or drippings passing through the bed of coals and collected in channels 102.

Below coal grate 97 is a conventional S-shaped tubular gas burner 100 which, in conjunction with the bed B of ceramic briquettes provides a source of radiant and convection cooking heat. Food to be cooked by this heat source may be supported on a horizontal food cooking grill 140, on a rotisserie spit 60, or both. The burner 100 also provides radiant and convection heat to a smoker tray 120 for igniting and burning woodchips in the tray so as to provide flavoring smoke to food cooked either on grill 140 or on spit 60.

The burner 100 is mounted within horizontal pan 148 by means of brackets 220-220 secured to bottom wall 155. The brackets may be located at the respective turns of the burner as illustrated in FIG. 7. Alternatively, pairs of brackets may cradle each side to side run of the S-shaped burner. The horizontal baffle 224 surrounds the horizontal runs of the burner which has a series of spaced gas exit ports along the upper surface thereof (not shown). The terminal end of burner 100 passes through an aperture in a side panel of heat baffle 224 so as to be supported by the baffle at that point.

With a reference to FIG. 7, a vertical run of burner 91 passes freely through an aperture 105 in the bottom wall 155 and is detachably connected to a gas supply conduit by means of a coupling (not shown) which may include a gas orifice for conveying a proper gas-air mixture to the burner ports. Gas burner 100 also has a vertical run which passes freely through an aperture 106 in the bottom wall 155 and is detachably connected to a gas supply conduit by a detachable coupling (not shown) in a manner similar to that of burner 91.

The barbecue grill 90 may be fitted with a conventional rotisserie unit having a food holding spit 60 mounted at each end for rotation on the sidewalls 171 and 172 by means of journals 62. The spit extends horizontally across the housing enclosure with its food holding section adjacent to the front of the cooking area and its rotational axis approximately opposite to the middle of the vertical firebox 80. Food engaging prongs (not shown) may be mounted upon the spit 60 in conventional fashion. The rotisserie motor and related components are not shown since the entire rotisserie unit may be of a conventional design such as that shown in the patent to Topper, U.S. Pat. No. 3,019,720 of Feb. 6, 1962.

The barbecue grill also may be fitted with a drip pan 130 preferably located below the rotisserie so as to catch juices and other drippings falling from a roasting foodstuff, such as meat M, impaled upon the spit. Drip pan 130 may be of conventional design and is detachably mounted between opposing sidewalls 152 and 153 of the pan component of the grill housing by means of a pair of support rods 134-134 at each end of the drip pan.

The smoker tray of the present invention also may utilized in combination with the conventional open mesh cooking grill 140 of welded rod construction. The cooking grill 140 is preferably mounted above the coal grate in a manner similar to the smoker tray 120. Thus, the cooking grill 140 is readily mounted between inwardly projecting side ledges 167 and 168 an opposing sidewalls 152 and 153 of pan 148. Such a cooking grill may either be removed during spit cooking operations or left in place if the size of the foodstuff M on the spit is such that the cooking grill does not interfere with the rotation thereof. If left in place, the barbecue grill assembly can be used simultaneously for both conventional grilling upon wire grill 140 and spit barbecuing on spit 60 when both burner units are burning simultaneously. So that the heat rate can be precisely and independently adjusted for horizontal grilling, spit roasting and other cooking combinations as described below, separate gas control valves (not shown) are preferably provided for the vertical burner 91 and the horizontal burner 100.

The cooking grill 140, the drip pan 130 and the rotisserie spit 60 and related accessories are removable from the housing 150 so as not to interfere with removal of the components of both the vertical firebox and the horizontal firebox. As previously indicated, auxiliary rear wall 206 and its corresponding rear ledge 207 preferably are not connected either to rear wall 154 or to channel member 169 so that auxiliary wall 206, platform 208 and all related components are readily removable from horizontal pan 148. Similarly, smoker tray 120, smoker tray 12, vertical firebox 80, grate 97, baffle 224, grease container 215, and burners 91 and 100 preferably are not affixed to other components and are free to be lifted out of the grill enclosure. Removal of these components may be facilitated by removing hood 170 from horizontal pan 148.

As will be readily understood from the foregoing description, the smoker tray of the present invention can be installed within the hood of any conventional barbecue unit. All that is required to accommodate such an installation is the addition of appropriate ledges or mounting brackets or the provision of a smoker tray of an appropriate size to utilize existing ledges and/or brackets. As already indicated, the smoker tray may be utilized readily with either a horizontally disposed firebox or a vertically disposed firebox.

From the foregoing description, it is evident that the smoker tray of the present invention can be readily assembled and disassembled along with other components of a gas-fired barbecue grill. The smoker tray and other major components of the barbecue grill are adapted for shipment disassembled and for easy assembly at home or in a retail store.

In assembling a barbecue grill of the type described, the horizontal pan 148 is first suspended in a portable rectangular frame (not shown) which has upper members arranged to engage the underside of peripheral channel 169. This pan portion of housing 150 comes with burner apertures 105 and 106 in bottom wall 155 thereof. Heat baffle 224 is first inserted in the pan and then the horizontal burner 100 is inserted within the baffle 224 with its depending run passing through bottom wall aperture 106.

Preferably, rear burner 91 is first mounted upon platform 208 which is then placed in the pan so that the vertical run of burner 91 passes through aperture 105 in bottom wall 155. The end flanges 218 and 219 of platform 208 are rested upon pan sidewall ledges 167 and 168 and platform 208 is pushed back into position until its auxiliary supporting wall 206 abuts rear pan wall 155. Grate 97 is then suspended between the support members 212 and 226 and a bed of refractory briquettes is laid thereon. At this point, the unit may serve as a horizontal barbecue grill upon suspension of wire cooking grill 140 between pan sidewall ledges 167 and 168. If smoke flavoring is desired, the smoker tray 120 may be suspended behind wire grill 140 with its end flanges 122 and 123 also resting upon pan sidewall ledges 167 and 168.

If spit barbecuing is desired, assembly of the combination unit would continue. Next, the hood 170 would be positioned over and seated upon horizontal pan 148. This is more easily accomplished with cooking grill 140 and smoker tray 120 removed temporarily. Vertical firebox 80 is then mounted within the hood by slipping the slots at the base of each of its sidewalls over the burner 91 while simultaneously fitting hanger 97 into the vertical slot defined by clip 78 on the rear wall of the hood. Before placing vertical firebox 80 in place, it is easier and preferable to fill the basket 94 with ceramic briquettes 36 so as to form a vertical briquette panel P as seen best in FIG. 4. At this juncture, assembly of the two firebox components is complete and the burners may be connected to a source of bottled gas and the rotisserie unit 60 installed.

In the combination unit or with the vertical firebox 80 alone, the smoker tray 12 preferably is installed in the top of the vertical firebox with its end flanges or lips 34-34 resting upon the top edge 92 of the firebox sidewalls 93. For this purpose, the basket 94 is filled to a level that will be just below the bottom wall 28 of the smoker tray so as to leave sufficient space for inserting the smoker tray within the top portion of vertical firebox 80. This is the preferred position of the smoker tray when the vertical firebox is in use and a single tray is usually sufficient to provide flavoring smoke both to food cooked on the spit 60 and on the grill 140. However, a second smoker tray 120 may be provided within the horizontal firebox when this firebox is in use as previously indicated.

In using the combination unit, either the horizontal or the vertical burner, or both, may be lighted, depending on the direction of heat and the degree of heat and smoke desired. Preferably, each burner is separately valved with a fine adjustment gas control so that the heat output of both the vertical and horizontal fireboxes can be precisely regulated for the type and style of cooking desired. The drip pan 130 may be either substituted for the wire grill 140 or both elements may be used in combination so that convection heat only is available from burner 100 to areas of spit 60 or grill 140 immediately above the drip pan.

With the novel design and construction shown, it has been found that an extremely versatile and relatively inexpensive barbecue unit can be provided for easy on-site assembly. Although of compact construction, the unit has a very broad heating range within which the temperature can be adjusted to cook and flavor any food susceptible of being cooked in a conventional kitchen oven. Use of the vertical firebox alone allows food to be cooked without any grease or drippings falling on a heated surface, thereby eliminating smoke from such drippings which may interfere with the flavoring provided by burning woodchips in the smoker tray. Nevertheless, when flavoring with such drippings is desired, the horizontal firebox assembly may be fired up to rapidly burn the drippings at high efficiency and produce a combination or alternative flavoring.

In addition, when the drip pan is placed between the horizontal refractory bed and the cooking food, yet another flavoring technique is available. Depending on the heat rate selected for burner 100, the drippings may be either burned to produce flavoring smoke or merely vaporized at low heat to produce a moist vapor for tenderizing the food. Of course, various combinations of smoke and vapor are also available. Furthermore, the use of a drip pan allows flavoring ingredients, such as barbecue sauce to be mixed with the food drippings so as to provide a basting liquid which may be applied periodically to the cooking food by a brush or the like. This will also change the composition of flavoring vapors, providing a still further variation in culinary procedure.

The relative rates of generating smoke from wood chips and of vaporizing and/or burning drippings and flavoring sauces are readily controlled by regulating the heat output of the separate burners. Similarly, the rate of cooking the foodstuff internally and the amount of radiant and convection heat to which its surface is exposed during the cooking process can be regulated in a number of fashions by adjusting the heat output of the vertical firebox relative to that of the horizontal firebox, and in some instances by using the drip pan as a radiant heat shield.

Although but a few embodiments of the present invention have been described, other embodiments and variations may occur to those skilled in the art. It is possible of course to use various features of the specific embodiments described, either separately or in various combinations, and such uses are contemplated by the present invention. Furthermore, many structural changes are possible, such as various mountings for the body of the smoker tray and those changes are intended to be within the scope of this disclosure. It is also to be understood that the foregoing drawings and specification merely illustrate and describe preferred embodiments of the invention and that other embodiments are contemplated within the scope of the following claims.

What is claimed is:

1. A tray for flavoring food by burning woodchips and the like, said tray comprising:
   an elongated base;
   a pair of sidewalls extending along and outwardly from said base in opposing relation to define a container for supporting a supply of said woodchips from at least three sides, said sidewalls diverging outwardly from said base relative to an imaginary central plane extending through a longitudinal axis of said base and perpendicular to a surface of said base, and each of said sidewalls having a plurality of apertures at spaced intervals along the length of the sidewall; and,
   means for mounting said tray with its base above and in close proximity to a source of heat for burning said supply of woodchips when supported in said container with the sidewalls of said tray extending away from said heat source;
   the number, size and location of said apertures and the divergence of said sidewalls being such that when said tray is positioned with its base above and in close proximity to said heat source and with its sidewalls extending away from said heat source, said apertures permit sufficient direct heating of said woodchips to cause burning thereof by smoldering and the solid portions of said base and sidewalls provide sufficient shielding of said woodchips from said heat source to prevent flaming thereof.

2. The tray of claim 1 in which said tray has a substantially U-shaped or V-shaped transverse cross-section.

3. The tray of claim 2 in which said base contains at least one drainage aperture of a size that does not significantly change the ratio between the total apertured area and the total solid area of said base and sidewalls.

4. The tray of claim 1 in which the ratio between the total solid area and the total apertured area of said base and sidewalls is in the range of about 10:1 to about 20:1.

5. The tray of claim 1 in which the ratio between the total solid area and the total apertured area of said base and sidewalls is in the range of about 15:1 to about 18:1.

6. The tray of claim 1 in which the ratio between the total solid area and the total apertured area of said base and sidewalls is in the range of about 16:1 to 17:1.

7. The tray of claim 1 in which said apertures are arranged in at least one row in each of said sidewalls.

8. The tray of claim 1 in which said apertures are arranged in at least two rows in each of said sidewalls.

9. The tray of claim 8 in which the apertures in different rows of each of said sidewalls are arranged in a staggered relationship.

10. The tray of claim 1 in which said sidewalls are substantially symmetrical relative to said imaginary central plane.

11. The tray of claim 1 in which the angle of divergence between each of said sidewalls and said central plane is in the range of about 10° to about 50°.

12. The tray of claim 1 in which the angle of divergence between each of said sidewalls and said central plane is in the range of about 15° to about 45°.

13. The tray of claim 1 in which the angle of divergence between each of said sidewalls and said central plane is in the range of about 20° to about 30°.

14. The tray of claim 1 in which said base is substantially flat in transverse cross-section.

15. The tray of claim 1 in which said mounting means comprises an end wall integrally connected to each end of said tray, each end wall having a tab for engaging an underlying support structure such as a ledge or ridge.

16. The tray of claim 15 in which each of said end walls includes a wall portion having a shape substantially the same as the cross-sectional shape of said base and sidewalls in a plane substantially transverse to said longitudinal axis of said base and substantially perpendicular to said surface of said base.

17. The tray of claim 1 in which at least a portion of an edge of said end wall is spaced from an adjacent one of said sidewalls to provide a gap for drainage adjacent to said base.

18. A tray for flavoring food by burning woodchips and the like, said tray comprising:
   wall means including an elongated base portion, a pair of opposing sidewall portions each extending longitudinally along said base portion, and a pair of opposing end wall portions each extending transversely across said base portion, said sidewall portions and end wall portions extending outward from the same side of said base portion to define a container for holding said woodchips, said sidewall portions diverging outwardly from said base portion relative to an imaginary central plane extending through a longitudinal axis of said base portion and perpendicular to a surface of said base portion, and said sidewall portions containing a plurality of apertures at spaced intervals along the length thereof; and, means for mounting said tray with its base portion above and in close proximity to a source of heat for burning said woodchips;

the number, size and location of said apertures and the divergence of said sidewalls being such that when said tray is positioned with its base portion above and in close proximity to said heat source and with its end wall and sidewall portions extending away from said heat source, said apertures permit sufficient direct heating of said woodchips to cause burning thereof by smoldering and the solid portions of said wall means sufficiently shield said woodchips from said heat source to prevent flaming of said woodchips.

19. The tray of claim 18 in which said outwardly extending portions are surrounded by a frame having walls positioned to direct through said apertures a flow of convection heat from said heat source.

20. An apparatus for flavoring food comprising a tray for burning woodchips and the like and a frame means having a pair of opposing walls for guiding toward said tray a flow of convection heat generated by a heat source, said tray comprising:

an elongated base;

a pair of sidewalls extending along and outwardly from said base in opposing relation to define a container for supporting a supply of said woodchips from at least three sides, each of said tray sidewalls being opposite and in spaced relation to at least a portion of a corresponding one of said pair of frame walls, and each of said tray sidewalls having a plurality of apertures at spaced intervals along the length thereof; and, means for mounting said tray with its base above and in close proximity to said heat source and with its sidewalls extending away from said heat source;

the number, size and location of said apertures and opposing relation between said tray sidewalls, and the spaced relation between said tray sidewalls and said frame walls being such that when said tray is positioned with its base above and in close proximity to said heat source and with its sidewalls extending away from said heat source, said apertures permit sufficient direct heating of said woodchips to cause burning thereof by smoldering and the solid portions of said base and tray sidewalls provide sufficient shielding of said woodchips from said heat source to prevent flaming thereof.

* * * * *